(12) United States Patent
Kishi

(10) Patent No.: US 7,770,594 B2
(45) Date of Patent: Aug. 10, 2010

(54) LIQUID SHUTOFF VALVE GEAR

(75) Inventor: Morihiko Kishi, Kanagawa (JP)

(73) Assignee: Piolax Inc., Yokohama-shi (JP)

( * ) Notice: Subject to any disclaimer, the term of this patent is extended or adjusted under 35 U.S.C. 154(b) by 361 days.

(21) Appl. No.: 11/819,754

(22) Filed: Jun. 28, 2007

(65) Prior Publication Data

US 2007/0295403 A1 Dec. 27, 2007

(51) Int. Cl.
*F16K 24/04* (2006.01)
(52) U.S. Cl. .......................................... 137/202; 137/43
(58) Field of Classification Search .................... 137/39, 137/43, 202, 587, 590.5
See application file for complete search history.

(56) References Cited

U.S. PATENT DOCUMENTS

| | | | | |
|---|---|---|---|---|
| 5,931,183 | A * | 8/1999 | Yoshihara | 137/202 |
| 6,405,747 | B1 * | 6/2002 | King et al. | 137/202 |
| 6,422,261 | B1 * | 7/2002 | DeCapua et al. | 137/202 |
| 6,425,379 | B2 * | 7/2002 | Shimamura et al. | 137/202 |
| 6,592,100 | B2 * | 7/2003 | Chou et al. | 137/43 |
| 6,843,268 | B2 * | 1/2005 | Yamada et al. | 137/202 |
| 2004/0055638 | A1 * | 3/2004 | Yamada et al. | 137/202 |

FOREIGN PATENT DOCUMENTS

| | | |
|---|---|---|
| JP | 8-159318 | 6/1996 |
| JP | 2003-185046 | 7/2003 |
| JP | 2005-297787 | 10/2005 |

* cited by examiner

*Primary Examiner*—John Rivell
*Assistant Examiner*—Craig Price
(74) *Attorney, Agent, or Firm*—McGinn IP Law Group, PLLC

(57) ABSTRACT

A liquid exhaust valve gear includes a housing divided into an upper chamber and a lower chamber by being partitioned by a partition plate having an opening portion, and a float slidably contained at inside of the lower chamber and moved up by receiving liquid inside of the hermetically sealed vessel. An upper end portion of the float is provided with valve means for closing the opening portion of the partition plate in accordance with moving up the float, further, a partition wall in a cylindrical shape is provided to extend in an upper direction from a peripheral edge of the opening portion at inside of the upper chamber, the partition wall is opposed to an opening of an exhaust port, and a notched portion which is not opposed to the opening of the exhaust port.

12 Claims, 13 Drawing Sheets

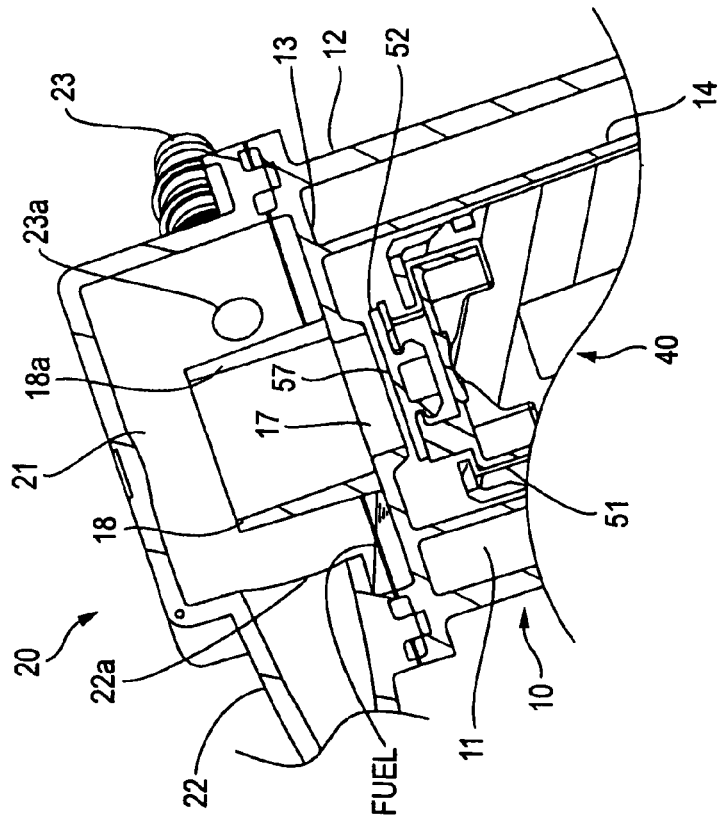
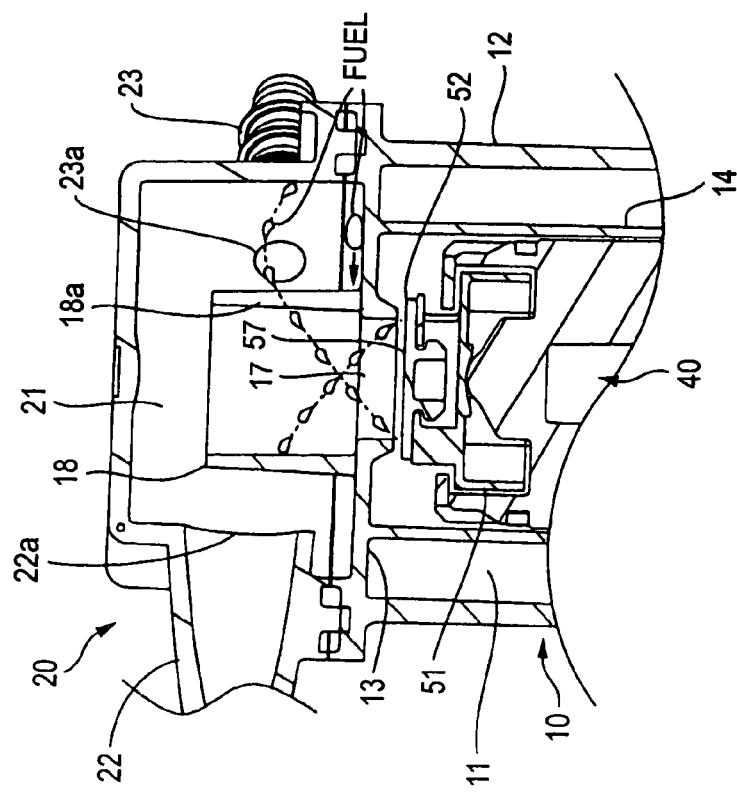

LIQUID SHUTOFF VALVE GEAR

BACKGROUND

1. Field of the Invention

The present invention relates to a liquid shutoff valve gear installed at an upper portion at inside of a hermetically sealed vessel by providing a function of communicating with outside for exhausting a gas at inside of the vessel in accordance with supply of a liquid.

2. Description of the Related Art

A liquid shutoff valve gear is arranged at, for example, an upper portion of inside of a fuel tank of an automobile or the like and is constituted to communicate with a canister at outside thereof. The liquid shutoff valve gear exhausts an evaporated gas to the canister in accordance with supply of a fuel to inside of the fuel tank. Further, when supply of the fuel reaches a predetermined level, communication with the canister is automatically shut off. Thereby, the liquid shutoff valve gear can detect a fuel amount and prevent the fuel from flowing out. As an apparatus of this kind, there is pointed out a liquid shutoff valve disclosed in JP-A-2005-297787 or the like.

Here, simply explaining of the fuel shutoff valve of JP-A-2005-297787, the fuel shutoff valve is constructed by a constitution including a casing having a valve chamber, a valve body mechanism having a float and a seat member and a spring for opening and closing a path connected to the canister by moving up and down the float in accordance with a liquid level of the fuel of the fuel tank.

When the fuel is supplied to the fuel tank, a fuel vapor stored in accordance with a rise of the liquid level of the fuel at inside of the fuel tank can be escaped to a side of the canister by way of the connecting path of the casing. Further, when the fuel reaches the predetermined liquid level of the fuel, the fuel flows into the valve chamber, thereby, the float is moved up and the connecting path is closed. By such a constitution, the fuel vapor from the fuel tank is escaped and the fuel is prevented from flowing out to outside of the fuel tank.

Now, there is a case in which according to a liquid control valve gear, when a connecting path is closed, a splash of the fuel is blown to an inner side of the connecting path by rapidly closing the valve hermetically. In order to prevent this, according to the apparatus of JP-A-2005-297787, there is constructed a constitution in which a first connecting path and a second connecting path are provided, and a seat member closes the connecting paths in steps in accordance with the rise of the liquid level of the fuel. However, even when the splash of the fuel can be prevented in closing the valve by such a constitution, in a case of rocking the fuel tank by vibration or the like, a small gap is produced between the seat member and the connecting paths, and there is a concern of blowing the splash of the fuel to inner sides of the connecting paths.

Further, in order to prevent the splash of the fuel from being blown as described above, a stop valve of JP-A-8-159318 is constructed a constitution of providing a fuel splash flow out preventing plate. However, according to the stop valve of JP-A-8-159318, when the splash of the fuel flows out by riding over the fuel splash flow out preventing plate, the flowed-out fuel cannot be recovered but flows out to outside of the fuel tank over time.

Further, a liquid shutoff valve gear of JP-A-2003-185046 is provided with a cylindrical portion as in JP-A-8-159318 and is provided with a second opening portion for recovering the flowed-out fuel. However, according to the liquid shutoff valve gear of JP-A-2003-185046, a structure thereof becomes complicated such that it is necessary to provide a shutoff valve for closing the second opening portion other than a float.

SUMMARY

As an aspect of the invention, there is provided a liquid shutoff valve gear capable of restraining a splash of a liquid and firmly preventing the liquid from flowing out to outside by a simple shape.

As a first aspect of the invention, there is provided a liquid shutoff valve gear provided at an upper space at inside of a hermetically sealed vessel for containing a liquid for making a gas flow in and out to and from outside and shutting off a leakage of the liquid from the hermetically sealed vessel, the liquid shutoff valve gear including a housing divided into an upper chamber and a lower chamber by being partitioned by a partition plate having an opening portion, and a float slidably contained at inside of the lower chamber and moved up by receiving a buoyancy from the liquid at inside of the hermetically sealed vessel, wherein the upper chamber is opened with an exhaust port communicating with outside of the hermetically sealed vessel at a peripheral wall thereof, an upper end portion of the float is provided with valve means for closing the opening portion of the partition plate in accordance with moving up the float, and a partition wall in a cylindrical shape is provided to extend in an upper direction from a peripheral edge of the opening portion at inside of the upper chamber, the partition wall is opposed to an opening of the exhaust port, and a notched portion brought into contact with at least the peripheral edge of the opening portion is formed at a portion thereof which is not opposed to the opening of the exhaust port.

According to a second aspect of the invention, the upper chamber is formed with a floor face by an upper face of the partition plate, and the floor face is formed by a flat shape or a cone shape for guiding the liquid invading inside of the upper chamber to the opening portion by way of the notched portion by constituting a premise by the first aspect of the invention.

According to a third aspect of the invention, the upper chamber is opened with a gas introducing port for taking a gas at inside of the hermetically sealed vessel to guide to the exhaust port when the opening portion of the partition plate is closed by the valve means at a peripheral wall thereof, and the notched portion is formed at a portion thereof which is not opposed to also an opening of the gas introducing port by constituting a premise by the first aspect or the second aspect of the invention.

Further, according to a fourth aspect of the invention, the opening of the exhaust port is provided at a position projected to an inner side of an inner peripheral face of the upper chamber by constituting a premise by any of the first aspect through the third aspect of the invention.

According to the first aspect of the invention, a phenomenon in which the liquid directly enters the exhaust port provided at inside of the upper chamber from the opening portion of the partition plate can firmly be prevented by the partition wall in the cylindrical shape provided at the peripheral edge of the opening portion. Further, even when the liquid assumedly enters inside of the upper chamber from the opening portion of the partition plate, the liquid can swiftly be guided to the opening portion by way of the notched portion at the partition wall.

Here, when the floor face of the upper chamber is formed in the flat shape or the cone shape for guiding the liquid to the opening portion by way of the notched portion as in the second aspect of the invention, the liquid is made to be easy to move and the liquid can be guided to the opening portion further swiftly.

Further, when the notched portion is formed at the portion which is not opposed to the opening of the gas introducing port as in the third embodiment of the invention, the partition wall in the cylindrical shape is opposed to the opening of the gas introducing port. Therefore, even when the liquid advances from the gas introducing port, the liquid can be prevented from directly entering the exhaust port firmly by the partition wall.

Further, according to the fourth embodiment of the invention, for example, when the liquid shutoff valve gear is inclined, the liquid at inside of the upper chamber is stored along the inner peripheral face, and therefore, the liquid can be restrained from leaking out from the opening of the exhaust port projected from the inner peripheral face.

As has been explained above, according to the invention, the splash of the liquid can be restrained and the liquid can firmly be prevented from flowing out to outside by the simple shape.

BRIEF DESCRIPTION OF THE DRAWINGS

These and other objects and advantages of this invention will become more fully apparent from the following detailed description taken with the accompanying drawings in which:

FIG. 3A is a front view, FIG. 3B is a side view, FIG. 3C is a top view, and FIG. 3D is a bottom view;

FIG. 4A is a front sectional view, FIG. 4B is a sectional view taken along a line A-A of FIG. 3A, and FIG. 4C is a sectional view taken along a line B-B of FIG. 3A;

FIG. 8A is a side view of a valve member, FIG. 8B is a side sectional view of the valve member, FIG. 8C is a side sectional view of the movable valve, and FIG. 8D is a perspective view of the movable valve;

FIG. 9A is a perspective view, FIG. 9B is a sectional view taken along a line C-C of FIG. 3A, and FIG. 9C is a view enlarging a D portion of FIG. 4A;

FIG. 10A shows a state before the fuel reaches the liquid shutoff valve gear, FIG. 10B shows an initial state in which the fuel reaches the liquid shutoff valve, and FIG. 10C shows a state in which the fuel is filled up;

FIG. 13A and FIG. 13B are enlarged sectional views showing the upper chamber of the liquid shutoff valve gear according to the embodiment of the invention, FIG. 13A is a sectional view when the valve means is closed, and FIG. 13B is a sectional view when the liquid shutoff valve gear is inclined.

DESCRIPTION OF THE EMBODIMENTS

An embodiment of the invention will be explained in details in reference to the drawings as follows.

Figure 1:
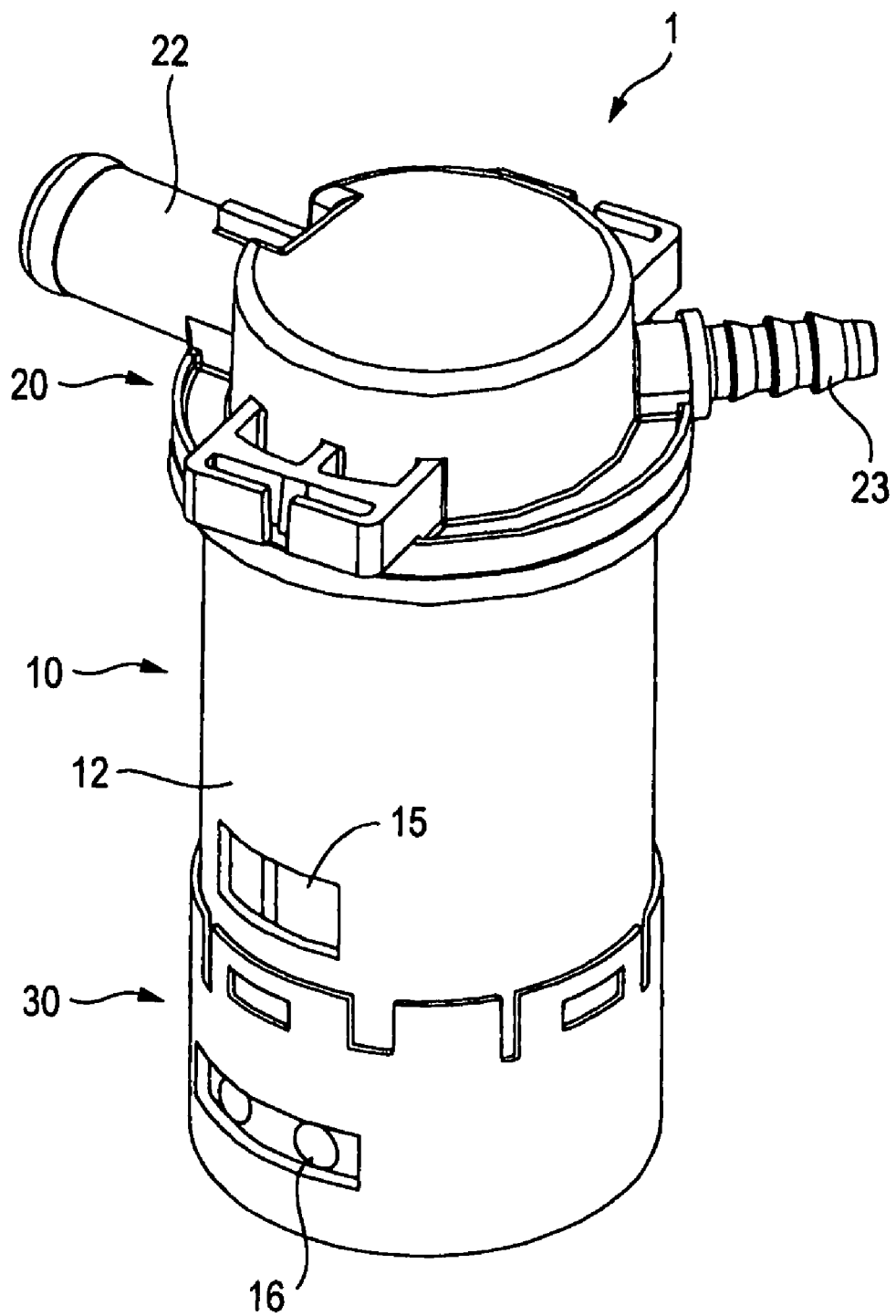
FIG. 1 is a perspective view showing a total constitution of a liquid shutoff valve gear according to an embodiment of the invention.
Figure 2:
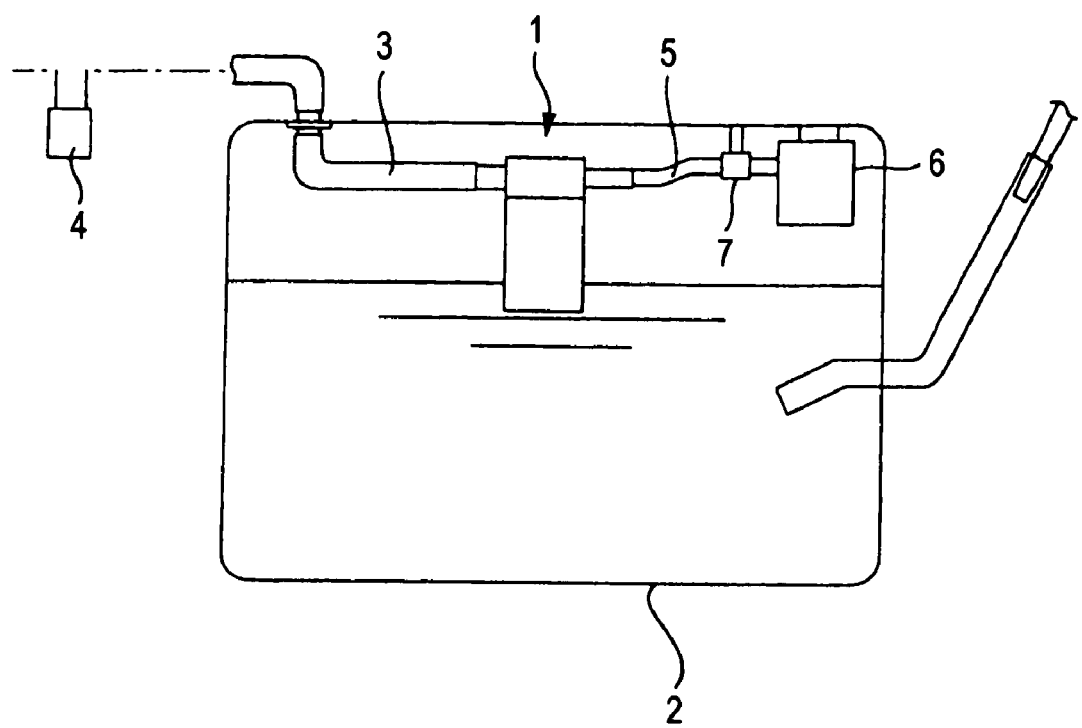
FIG. 2 is a side sectional view showing a state of installing the liquid shutoff valve gear according to the embodiment of the invention to a fuel tank.

FIG. 1 through FIG. 13B are views showing a constitution of a liquid control valve gear according to the embodiment of the invention. FIG. 1 is a perspective view showing a total constitution of the liquid shutoff valve gear, and FIG. 2 is a side sectional view showing a state of installing the liquid shutoff valve gear at a fuel tank.

As shown by FIG. 1, an outer shell of the liquid shutoff valve gear is formed by a housing 1 molded by a resin in a cylindrical shape. As shown by FIG. 2, the liquid shutoff valve gear is provided at an upper space at inside of a fuel tank 2 (hermetically closed vessel) for containing a liquid fuel (hereinafter, simply referred to as fuel) of an automobile or the like and is communicated with a canister 4 at outside thereof by way of a connecting path 3 for exhausting. When a fuel is supplied to inside of the fuel tank 2, a gas of a fuel vapor or the like (hereinafter, referred to as evaporated gas) filled at inside of the fuel tank 2 is exhausted to the canister 4 at outside thereof by way of the liquid shutoff valve gear. Further, when the supplied fuel is substantially filled up, a gas exhausting path at inside of the liquid shutoff valve gear is closed to shut off leakage of the fuel.

Figure 3C:
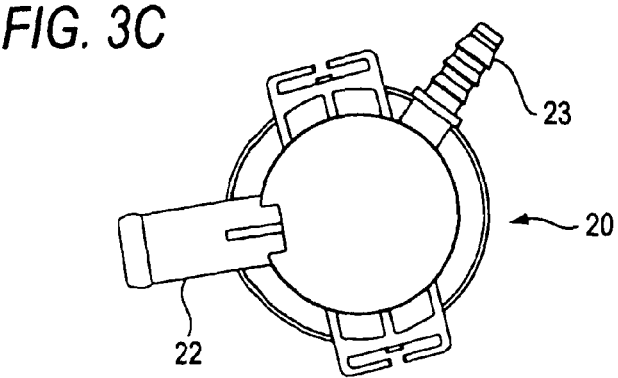
FIG. 3A through FIG. 3D are development views showing a total constitution of the liquid shutoff valve gear according to the embodiment of the invention.
Figure 3A:
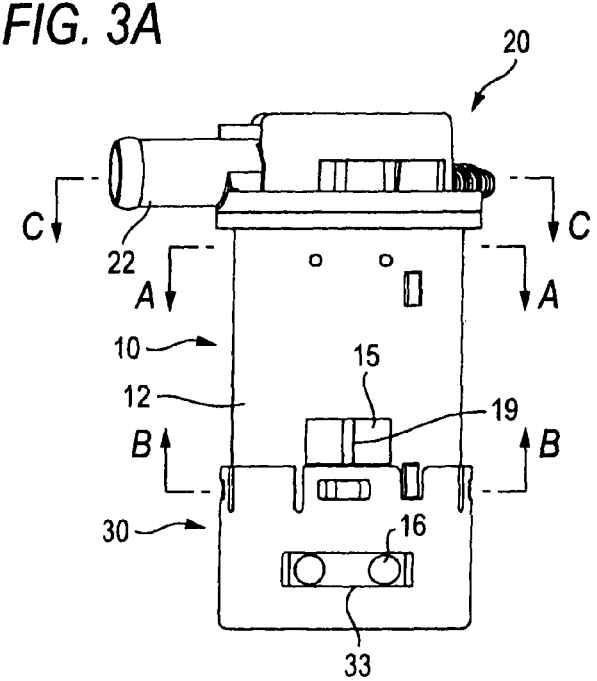
Figure 3B:
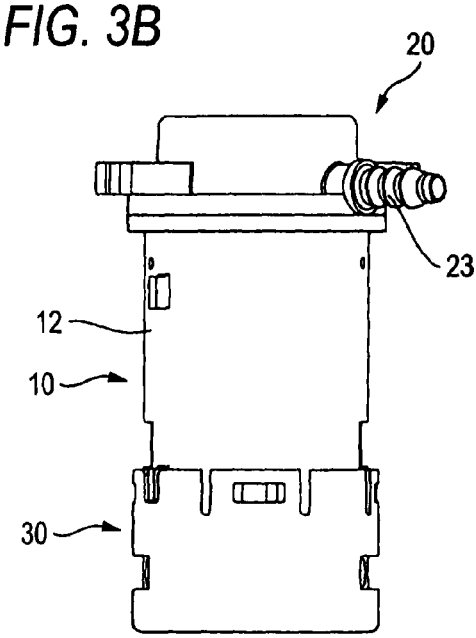
Figure 3D:
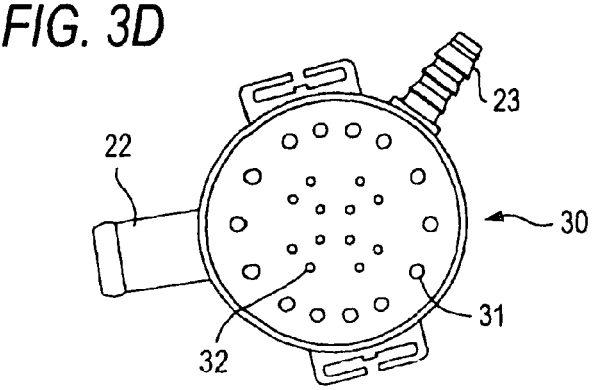
Figure 4B:
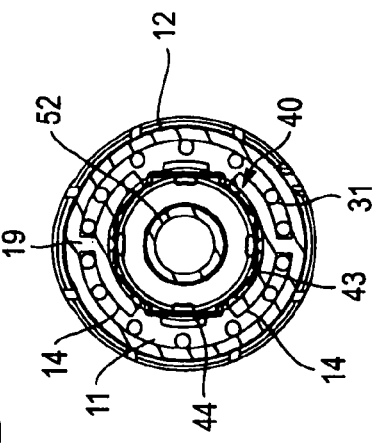
FIG. 4A through FIG. 4C are sectional views showing the total constitution of the liquid shutoff valve gear according to the embodiment of the invention.
Figure 4C:
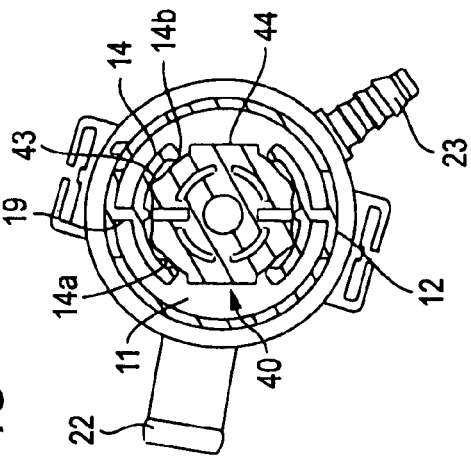
Figure 4A:
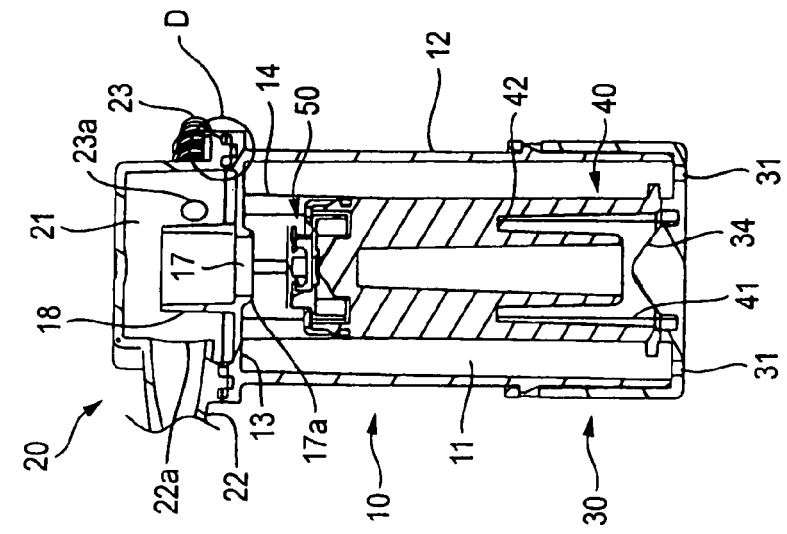
Figure 5:
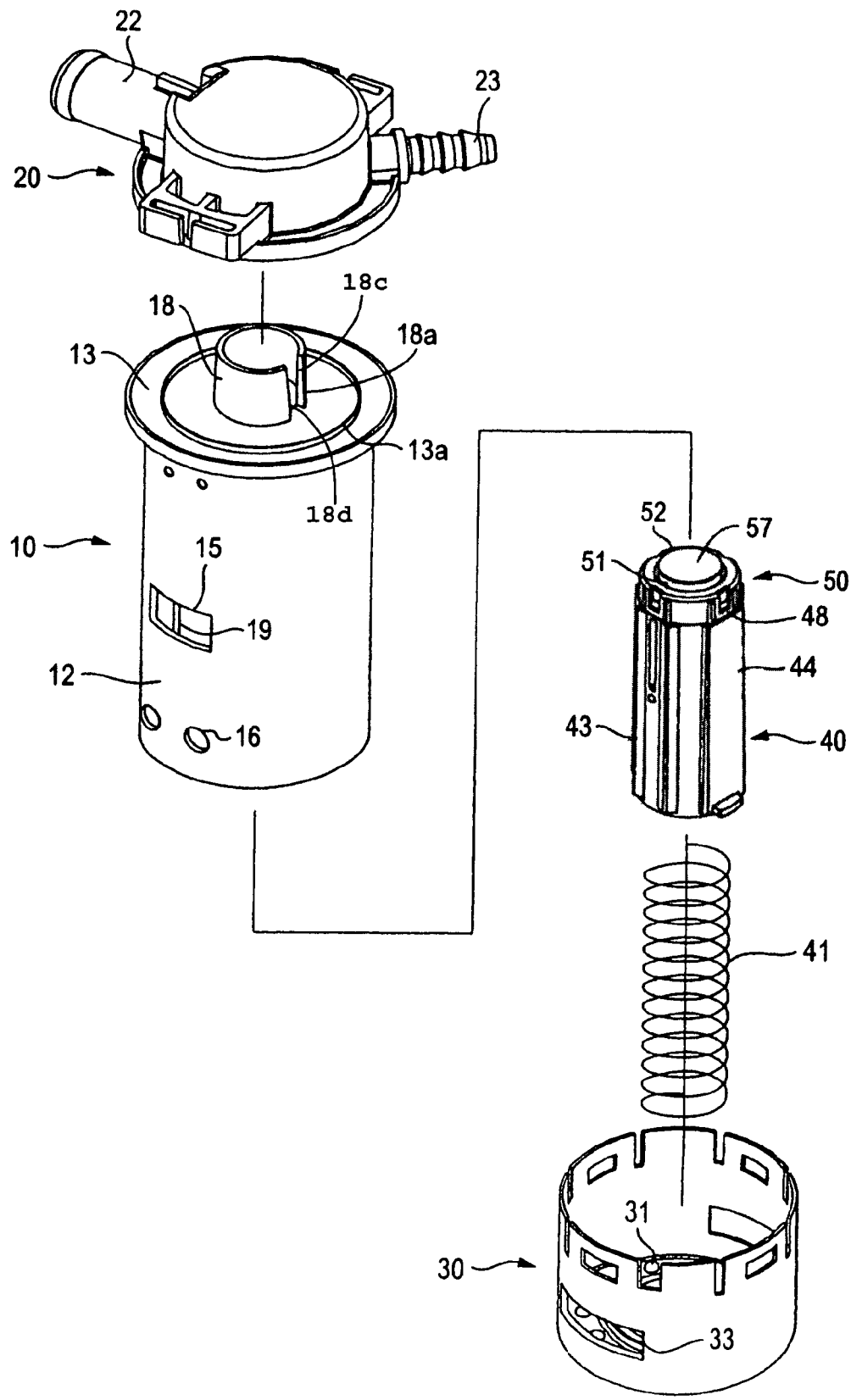
FIG. 5 is a disassembled perspective view showing the total constitution of the liquid control valve gear according to the embodiment of the invention.

FIG. 3A through FIG. 3D are development views showing a constitution of the liquid control valve gear according to the embodiment, FIG. 3A is a front view, FIG. 3B is a side view, FIG. 3C is a top view, FIG. 3D is a bottom view. Further, FIG. 4A through FIG. 4C are sectional views showing a total constitution of the liquid shutoff valve gear, FIG. 4A is a front sectional view, FIG. 4B is a sectional view taken along a line A-A of FIG. 3A, FIG. 4C is a sectional view taken along a line B-B of FIG. 3A. Further, FIG. 5 is a disassembled perspective view showing the total constitution of the liquid control valve gear, FIG. 6 is a perspective view showing constitutions of a housing main body and a cap member.

As shown by FIG. 3A through FIG. 6, the housing 1 forming the outer shell of the liquid shutoff valve gear is constructed by a constitution of mounting a lid head member 20 at one end portion (upper end portion) of a housing main body 10 and mounting a cap member 30 at other end portion (lower end portion) of the housing main body 10. Inside of the housing 1 is respectively formed with an upper chamber 21 at a portion thereof in correspondence with an inner side of the lid head member 20 and a lower chamber 11 at a portion thereof in correspondence with an inner side of the housing main body 10 (refer to FIG. 4A). A float 40 and a spring 41 are contained at the lower chamber 11 of the housing 1 (refer to FIG. 5).

Figure 6:
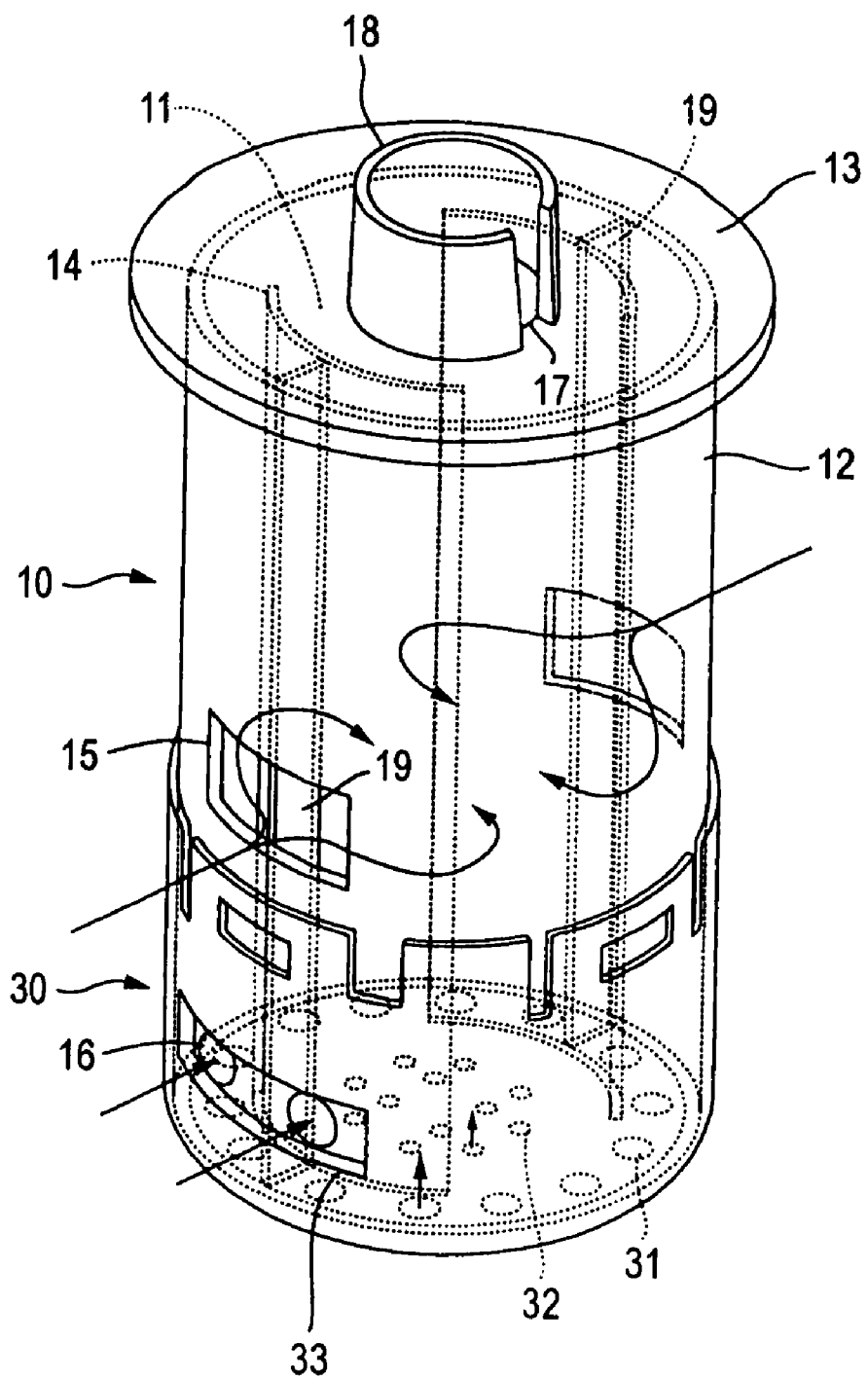
FIG. 6 is a perspective view showing a housing main body and a cap member of the liquid shutoff valve gear according to the embodiment of the invention.

As shown by FIG. 6, the housing main body 10 is constructed by a constitution including an outer cylinder 12 formed in a cylindrical shape, a partition plate 13 covering an upper end face of the outer cylinder 12, and an inner wall 14 extended in an axial direction at inside of the outer cylinder 12. The lower chamber 11 is formed by an inner space of the outer cylinder 12. A side peripheral face of the outer cylinder 12 is bored with respective first vent holes 15 at positions thereof opposed to each other. Further, a second vent hole 16 is bored at a position downward from the first vent hole 15. The respective vent holes 15, 16 are for making the evaporated gas and the fuel at inside of the fuel tank flow in and out to and from the inner space of the outer cylinder 12.

The upper chamber 21 and the lower chamber 11 of the housing 1 are divided by the partition plate 13 (refer to FIG. 4A). A center portion of the partition plate 13 is provided with an opening portion 17. There is constructed a constitution of communicating the upper chamber 21 and the lower chamber 11 by the opening portion 17. As shown by FIG. 6, an upper face side of the partition plate 13 is formed with a partition wall 18 in a cylindrical shape to extend from a peripheral edge of the opening portion 17 in an upper direction. The partition wall 18 is formed with a notched portion 18a. The notched portion 18a is formed by cutting to remove a portion of the partition wall 18 from an upper end thereof to a portion thereof brought into contact with the peripheral edge of the opening portion 17. Additionally, the partition wall may include a pair of end faces 18c and 18d facing, but not contacting, one another.

Further, according to the partition plate 13, as shown by FIG. 5, an outer peripheral edge thereof is extended to an outer side of the outer cylinder 12, and at an upper face of the partition plate 13, a ring-like projected portion 13a is projected at a position thereof on an inner side of the outer peripheral edge by a constant distance. The ring-like projected portion 13a is for preventing burrs produced when the lid head member 20 and the partition plate 13 are welded as described later. Further, the opening portion 17 of the partition plate 13 is formed with a projected portion 17a projected to a lower side from a peripheral edge of an opening end on a lower face side (lower chamber side).

As shown by FIG. 6, the inner wall 14 of the housing main body 10 is a constructed by a constitution of being substantially hung from a bottom face of the partition plate 13 in a lower direction at the lower chamber 11. The inner wall 14 is provided on the inner side of the outer cylinder 12 in a shape of a concentric circle by being spaced apart from each other by a constant gap. The inner walls 14 are respectively provided at positions opposed to each other. As shown by FIG. 4C, a pair of the inner walls 14 are formed with float guide support faces 14a at inner faces thereof bent in a shape of a circular arc and are provided with a function of slidably guiding to support the float 40 contained at inside of the lower chamber 11. Inner peripheral faces of the inner walls 14 are formed with a plurality of pieces (a total of 6 pieces according to the embodiment) of ribs 14b extended in the axial direction.

As shown by FIG. 6, the pair of inner walls 14 are arranged at positions of being opposed to the first vent holes 15 bored at the outer cylinder 12. A width of the two inner walls 14 is larger than the opening width of the first vent hole 15. Therefore, the inner wall 14 is arranged over an entire region at the inner side at which the first vent hole 15 is opened.

Here, an outer peripheral face of the inner wall 14 and an inner peripheral face of the outer cylinder 12 are connected by way of a connecting wall 19 extended in the axial direction. Further, the connecting wall 19 is extended in the axial direction at a middle portion of the first vent hole 15, and the opening of the first vent hole 15 is divided in left and right directions by the connecting wall 19. Therefore, the evaporated gas at inside of the fuel tank 2 is divided in left and right directions of the connecting wall 19 and flows from the first vent hole 15 to an inner portion of the outer cylinder 12. The evaporated gas which flows by being divided in this way flows to inside of the lower chamber 11 of the housing 1 by moving around two left and right ends of the inner wall 14.

The lid head member 20 of the housing 1 is molded by a resin in a cup-like shape, and an opening face of a lower end thereof is welded to fix to the upper face of the partition plate 13 of the housing main body 10. An inner space of the lid head member 20 forms the upper chamber 21. An outer peripheral wall of the lid head member is respectively provided with an exhaust port 22 for communicating to outside of the fuel tank 2 by way of the exhausting connecting path 3 shown in FIG. 2, a gas introducing port 23 for taking the evaporated gas at inside of the fuel tank 2 by way of a gas introducing connecting path 5 to guide to the exhaust port 22.

Here, explaining functions of respective apparatus and parts provided at inside of the fuel tank 2, the liquid shutoff valve gear prevents leakage of the fuel by closing the opening portion 17 of the partition plate 13 as described later when the fuel is filled up. However, in a state of closing the opening portion 17, also the evaporated gas is shut off from being exhausted and an inner pressure at inside of the fuel tank 2 is elevated. In order to prevent this, inside of the fuel tank 2 is provided with a cut valve 6 and a check valve 7 (refer to FIG. 2) to be able to exhaust the evaporated gas even when the fuel is filled up. The cut valve 6 is provided with a function of taking the evaporated gas at inside of the fuel tank 2, and the check valve 7 is provided with a function of a safety valve for introducing the evaporated gas transported from the cut valve 6 to the liquid shutoff valve gear when a pressure received from the cut valve 6 rises to a constant value or more.

The gas introducing port 23 of the lid head member 20 is provided with a function of receiving the evaporated gas transported from the cut valve 6 and the check valve 7 to inside of the upper chamber 21. Further, in exhausting the evaporated gas when the fuel is filled up, the evaporated gas may directly be exhausted to the canister 4 at outside thereof without interposing the liquid check valve gear. In this case, it is not necessary to provide the gap introducing port 23 at the liquid check valve apparatus.

Further, the inner peripheral face of the liquid head member 20 is bored with openings 22a, 23a of the exhaust port 22 and the gas introducing port 23 communicated from the outer peripheral wall (refer to FIG. 4A). The opening 22a of the exhaust port is provided at a position of being projected to an inner side of an inner peripheral face of the upper chamber 21. On the other hand, the opening 23a of the gas introducing port is provided at a position of not being opposed to the opening 22a of the exhaust port by being shifted in a peripheral direction.

The cap member 30 of the housing 1 is molded by a resin in a shape of a bottomed cylinder and is constituted to close a lower end opening face of the outer cylinder 12 in being integrated to the housing main body 10. As shown by FIG. 6, a bottom wall of the cap member 30 is bored with a first hole group 31 on an outer side of an inner diameter of the inner wall 14 of the housing main body 10 and bored with a second hole group 32 on an inner side of the inner diameter of the inner wall 14. The first group 31 is an aggregation of through holes having a comparatively large diameter, on the other hand, the second hole group 32 is an aggregation of through holes smaller than the first hole group 31. A total sum of opening areas of the through holes constituting the first hole group 31 is larger than a total sum of opening areas of through holes constituting the second hole group 32. Therefore, particularly, the evaporated gas is made to be liable to flow to inside of the lower chamber 31 of the housing 1 from the first hole group 31.

Further, a peripheral face of the cap member 30 is provided with a cut-to-open portion 33 for a vent hole for opening the second vent hole 16 provided at a peripheral wall of the outer cylinder 12 (refer to FIG. 3A, FIG. 6). Further, an inner bottom face of the cap member 30 is provided with a valve seat 34 for mounting the float 40 and the spring 41 (refer to FIG. 4A).

The float 40 is contained slidably at inside of the lower chamber 11 of the housing 1 and is provided with a function of moving up by receiving a buoyancy from a fuel at inside of the fuel tank 2 (refer to FIG. 4A). An upper end portion of the float 40 is provided with a movable valve 50 (valve means) for closing the opening portion 17 of the partition plate 13.

The float 40 is a member molded by a resin substantially in a shape of a cylinder an upper side of which is closed. The inner space of the float 40 is formed with a spring seat 42 and the inner space is inserted with the spring 41 when the float 40 is contained in the lower chamber 11. The float 40 is constituted by an arbitrary weight to rise pertinently by being provided with the buoyancy by the supplied fuel and an elastic force by the spring 41. Further, an outer diameter of the float 40 is set to a dimension slightly smaller than the inner diameter of the inner wall 14 formed at inside of the housing main body 10.

Figure 7:
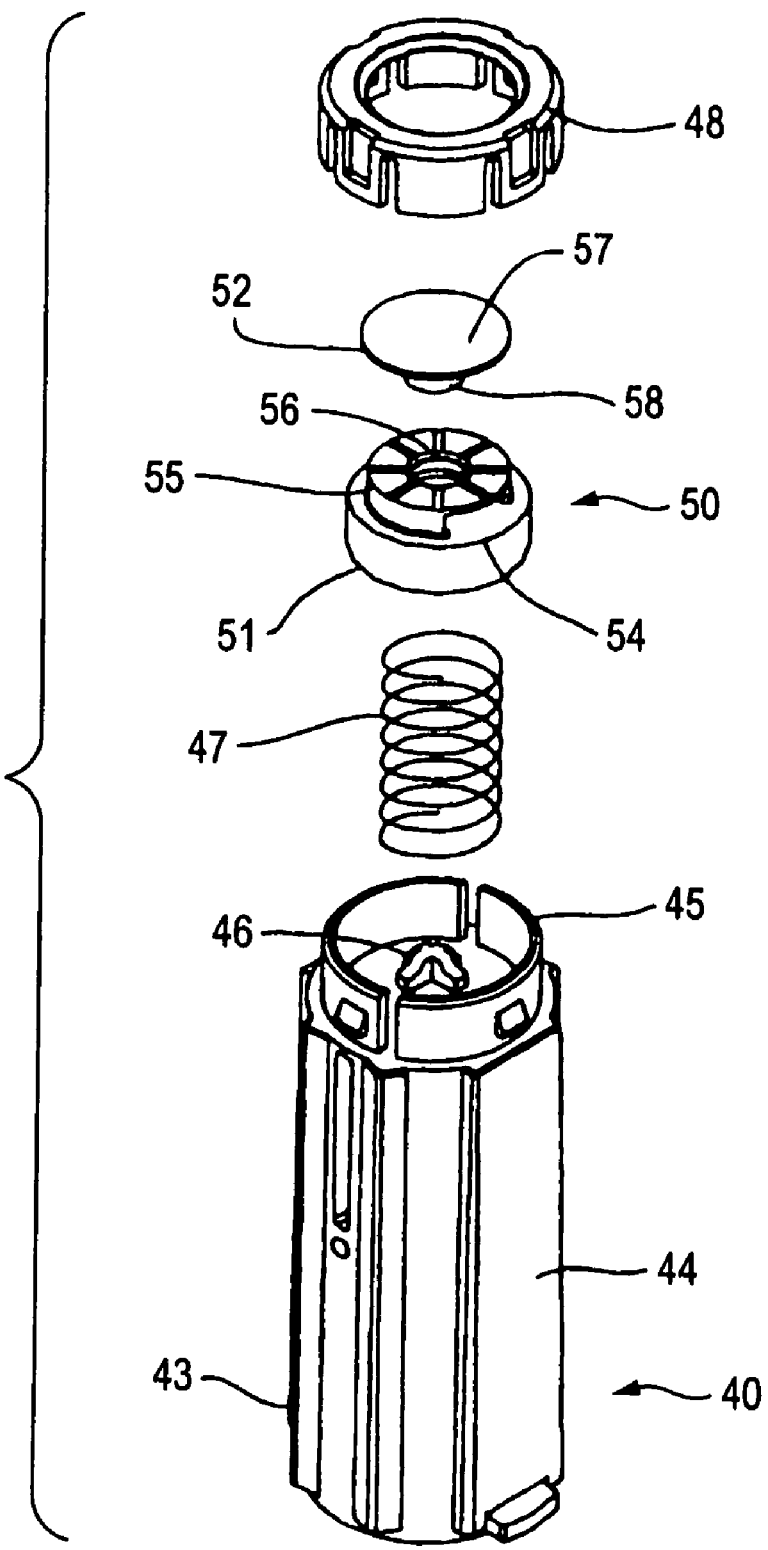
FIG. 7 is a disassembled perspective view showing a float of the liquid shutoff valve gear according to the embodiment of the invention.

FIG. 7 is a disassembled perspective view showing the float of the liquid shutoff valve gear according to the embodiment.

As shown by the drawing, an outer peripheral face of the float 40 is provided with 4 pieces of ribs 43 in an axial direction, and is provided with a pair of flat faces 44 constituting positioning references in being contained to inside of the lower chamber 11. An upper end portion of the float 40 is formed with a guide wall 45 extended in the axial direction by a predetermined inner diameter, and a projected portion 46 at a center portion of an upper end face thereof at inside of the guide wall 45. A top portion of the projected portion 46 of the float 40 according to the embodiment is formed by a face of a circular arc. Further, an upper end portion of the float 40 is provided with an urging member 47 and a movable valve holding cap 48 other than the movable valve 50.

The urging member 47 is arranged at a surrounding of the projected portion 46 provided at the upper end portion of the float 40 for urging the movable valve 50 contained on the inner side of the guide wall 45. The movable valve holding cap 48 is a ring-like resin-molded member a center portion of which is opened. The movable holding cap 48 is mounted to an outer peripheral face of the guide wall 45 of the float 40 in a state in which the movable valve 50 is contained on an inner side of the guide wall 45.

The movable valve 50 constituting valve means is constructed by a constitution including a movable valve main body 51, a valve member 52. The movable valve main body 51 includes a first floor plate 54 formed with a recessed portion 53 brought into contact with the projected portion 46 of the float 40, and a second floor plate 55 provided on an upper side of the first floor plate 54 by a predetermined gap therebetween (refer to FIG. 7). The recessed portion 53 of the movable valve 50 is formed by a face of a circular arc having a radius of curvature larger than that of the projected portion 46 of the float 40. Further, the second floor plate 55 of the movable valve main body 51 is formed with a mounting hole 56 penetrating to upper and lower faces thereof. Further, an upper face of the second floor plate 55 is formed with a plurality (a total of 6 pieces according to the embodiment) of groove portions 55a extended in a diameter direction from a hole edge of the mounting hole 56 to an outer peripheral edge of the second floor plate 55.

Figure 8A:
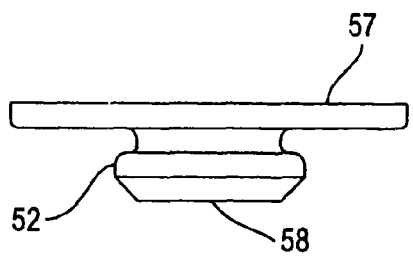
FIG. 8A through FIG. 8D are views enlarging to show a movable valve of the liquid shutoff valve gear according to the embodiment of the invention.
Figure 8B:
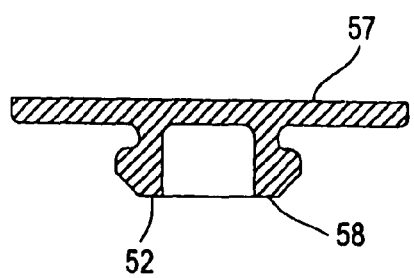
Figure 8C:
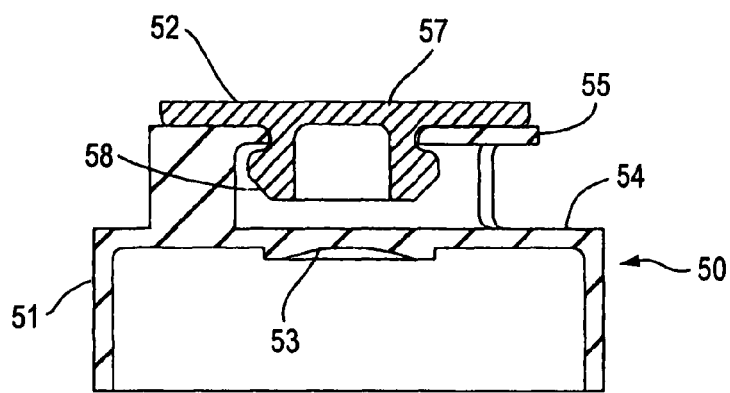
Figure 8D:
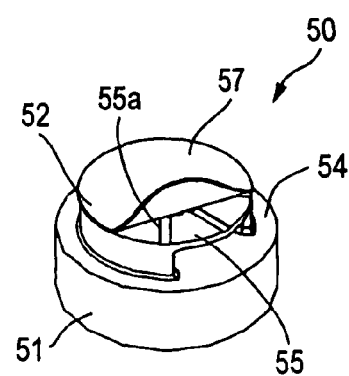

FIG. 8A through FIG. 8D are views enlarging to show the movable valve of the liquid shutoff valve gear according to the embodiment, FIG. 8A is a side view of the valve member, FIG. 8B is a side sectional view of the valve member, FIG. 8C is a side sectional view of the movable valve, and FIG. 8D is a perspective view of the movable valve.

As shown by FIGS. 8A, 8B, the valve member 52 of the movable valve 50 is formed by an elastic material, and is mounted to the upper face of the second floor plate 55 of the movable main body 51. The valve member 52 is constructed by a constitution of including an elastic valve portion 57 in a plate-like shape an upper face of which is constituted by a flat face and a mounting projected portion 58 formed at a center portion of a lower face of the elastic valve portion 57.

Next, the constitution of the liquid shutoff valve gear according to the embodiment will be explained further in details in line with an integrating procedure.

As shown by FIG. 7, FIG. 8C, the movable valve 50 is constructed by a constitution in which the mounting projected portion 58 of the valve member 52 is pressed to fix to the mounting hole 56 of the movable valve main body 51 from an upper face thereof. At this occasion, according to the movable valve 50, a portion of the mounting projected portion 58 pressed out from a lower face of the mounting hole 56 is arranged at a gap formed between the first, the second floor plates 54, 55.

The movable valve 50 integrated as described above is contained on an inner side of the guide wall 45 formed at the upper end portion of the float 40 along with the urging member 47. The movable valve 50 is brought into a state of being always urged in the upper direction by the urging member 47. Further, the movable valve holding cap 48 is fitted to the upper end portion of the float 40 from an upper portion. By the movable valve holding cap 48, the movable valve 50 is restricted in a range of moving in an up and down direction, and is prevented from being detached from an upper end portion of the float 40.

Further, in the state of integrating the movable valve 50, the recessed portion 53 of the first floor plate 54 and the projected portion 46 of the float 40 are brought into contact with each other to constitute a rocking fulcrum of the movable valve 50. Therefore, the movable valve 50 is movable in a diameter direction orthogonal to a center axis of the float 40 in an allowable range of movement. Further, the allowable range of movement of the movable valve 50 is formed by an inner peripheral face of the guide wall 45 of the float 40, and is restricted by bringing a peripheral face of the movable valve 50 into contact with the guide wall 45.

Further, although according to the embodiment, the projected portion 46 is provided at the upper end portion of the float 40 and the recessed portion 53 is provided at the bottom face of the movable valve main body 51, portions of installing the recessed and projected portions may naturally be reversed.

Figure 9B:
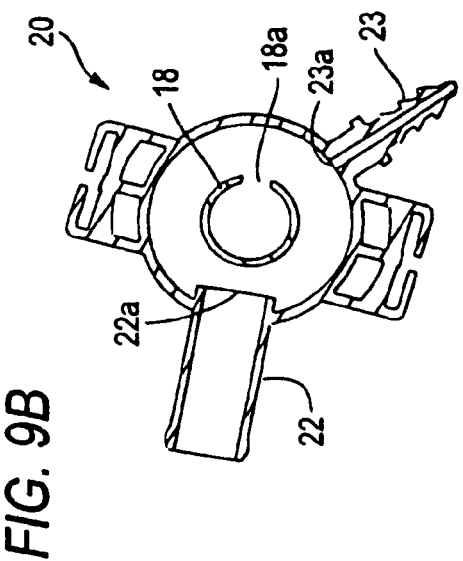
FIG. 9A through FIG. 9C are views showing an upper chamber of the liquid shutoff valve gear according to the embodiment of the invention.
Figure 9C:
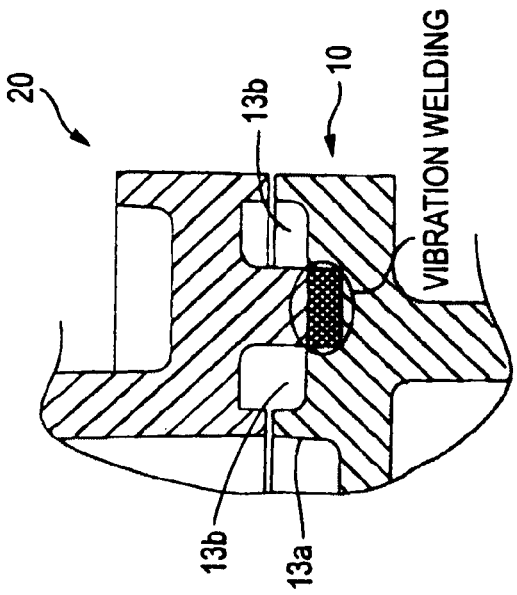
Figure 9A:
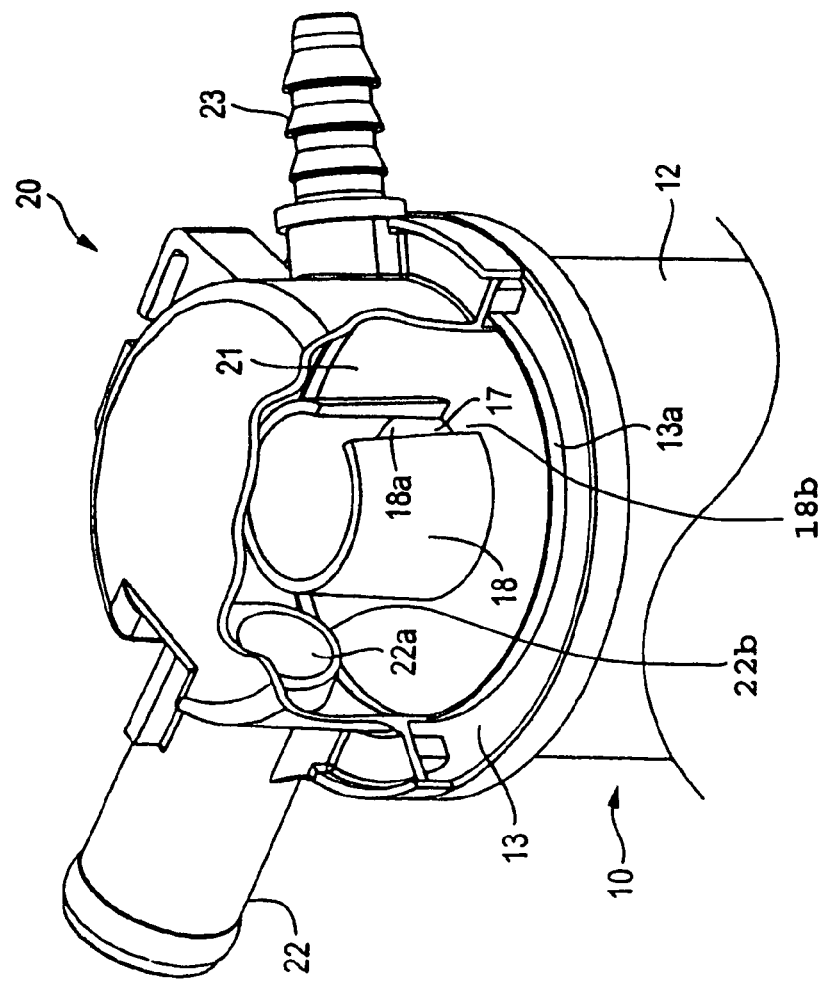

FIG. 9A through FIG. 9C are views showing the upper chamber of the liquid shutoff valve gear according to the embodiment, FIG. 9A is a perspective view, FIG. 9B is a sectional view taken along a line C-C of FIG. 3A, FIG. 9C is a view enlarging a D portion of FIG. 4A.

As shown by FIG. 4A through FIG. 4C, FIG. 9A through FIG. 9C, at an upper portion of the housing 1, the upper chamber 21 is formed by welding the opening face of the lid head member 20 to the upper face of the partition plate 13 of the housing main body 10. The upper chamber 21 is formed by the ring-like projected portion 13a provided above the partition plate 13 and the inner peripheral face of the lid head member 20. Further, as shown by FIG. 9C, the housing main body 10 and the lid head member 20 according to the embodiment are welded by vibration welding to be fixed solidly. The housing main body 10 is provided with the burrs storages 13b on both sides of positions of being welded to the lid head member 20 by vibration welding, and burrs having a concern of being produced by the vibration welding is prevented from flowing in. Thereby, the lid head member 20 is welded without deteriorating inside of the upper chamber 21 or an outlook of the liquid shutoff valve gear.

As shown by FIGS. 9A, 9B, the position of welding the housing main body 10 and the lid head member 20 is determined by a positional relationship with the notched portion 18a provided at the partition wall 18 in the cylindrical shape. That is, at inside of the upper chamber 21, the notched portion 18a is adjusted to be disposed on a reverse side of not being opposed to the opening 22a of the exhaust port. Further, the position of the notched portion 18a is a position of not being opposed also to the opening 23a of the gas introducing port mentioned above. Thereby, even when a liquid is transported from the gas introducing port, the liquid is hampered at inside of the upper chamber and the liquid is not made to flow out to the exhaust port. Additionally, the exhaust port 22 may be positioned such that a bottom 22b of the exhaust port 22 is disposed further from the partition plate than a bottom 18b of the notched portion 18a.

Further, a positional relationship among the openings 22a, 23a of the exhaust port and the gas introducing port and the notched portion 18a is not naturally limited to that of the embodiment, but, for example, the opening 22a of the exhaust port, the opening 23a of the gas introducing port, and the notched portion 18a may be positioned respectively at intervals of 120° centering on the opening portion 17 of the partition plate 13.

Further, as shown by FIG. 4A through FIG. 4C, FIG. 5, according to the liquid shutoff valve gear, the float 40 integrated with the movable valve 50 and the spring 41 are contained in the lower chamber 11 of the housing 1 and closed by the cap member 30. The float 40 is inserted along the float guide support plate 14a of the inner wall 14 of the housing main body 10, and arranged to be disposed at the gap of the inner wall 14 paired with the flat faces 44 formed at a side peripheral face. At this occasion, the float 40 is mounted onto the valve seat 34 of the cap member 30, and the second hole group 32 of the cap member 30 is disposed right below the float 40. Further, the spring 41 is elastically interposed between the valve seat 34 of the cap member 30 and the spring seat 42 of the inner portion of the float 40.

Further, when the float 40 is contained in the lower chamber 11, a constant clearance C is formed between the float 40 and the inner wall 14. The rib 43 provided at the side peripheral face of the float 40, or the rib 14b provided on the side of the inner wall 14 is interposed in the clearance C to be constituted to be brought into line contact with peripheral faces thereof opposed to each other in vibrating the float 40 or the like. Thereby, in slidingly moving the float 40, the float 40 per se is prevented from being rotated to restrain contact friction with the inner wall 14.

Figure 10A:
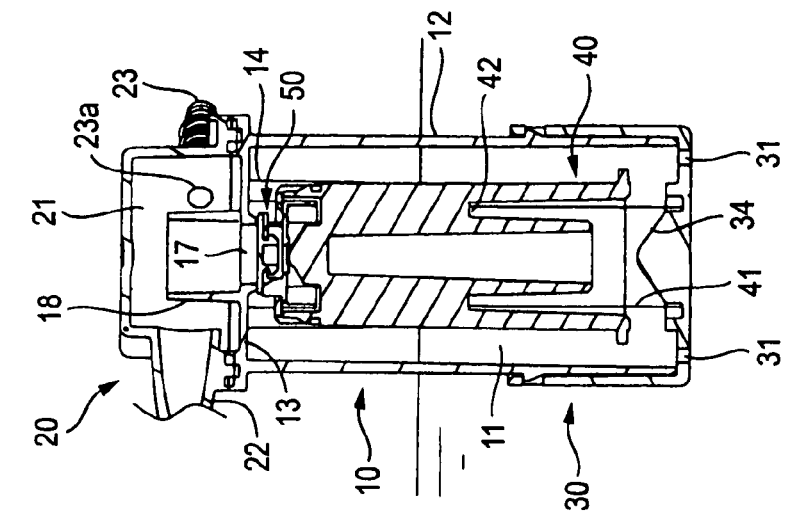
FIG. 10A through FIG. 10C are side sectional views showing an operation of the liquid shutoff valve gear according to the embodiment of the invention in supplying a fuel.
Figure 10B:
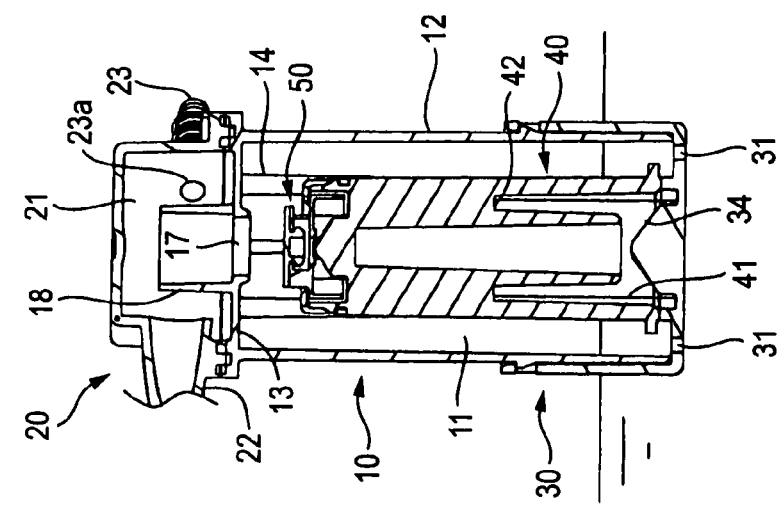
Figure 10C:
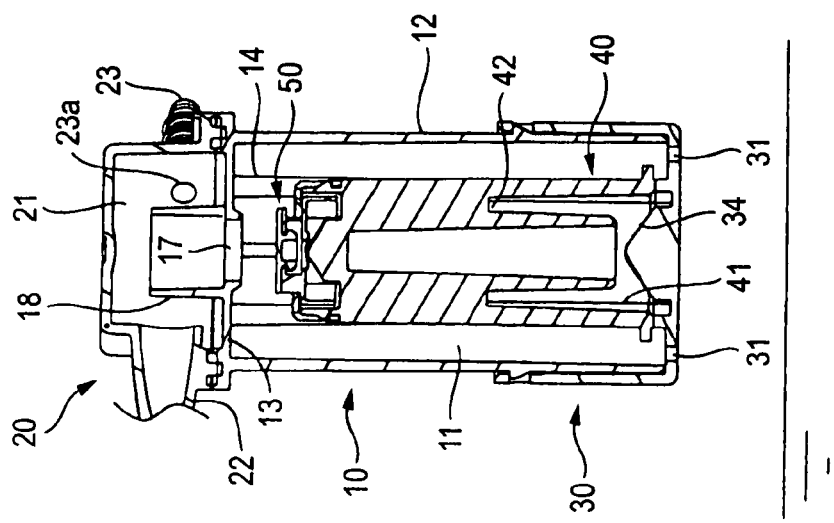

FIG. 10A through FIG. 10C are side sectional views showing an operation when a fuel is supplied to the liquid shutoff valve gear according to the embodiment, FIG. 10A shows a state before the fuel reaches the liquid shutoff valve gear, FIG. 10B shows an initial state when the fuel reaches the liquid shutoff valve, FIG. 10C is a state in which the fuel is filled up.

As shown by FIG. 10A, when the fuel does not reach the apparatus, the liquid shutoff valve gear installed at the upper portion of inside of the fuel tank 2, is brought into a state in which the float 40 at inside of the lower chamber 11 is mounted to the valve seat 34 of the cap member 30. At this occasion, the opening portion 17 communicating the upper chamber 21, the lower chamber 11 is opened to be brought into a state in which the evaporated gas can flow in thereto. Therefore, when the fuel is filled to inside of the fuel tank 2, the inner pressure of inside of the tank is elevated, the evaporated gas can be guided in an order of the lower chamber 11, the upper chamber 21 to be exhausted to outside.

As shown by FIG. 10B and FIG. 6, the filled fuel flows to inside of the lower chamber 11 from the first hole group 31 and the second hole group 32 of the cap member 30 when the fuel reaches the fuel shutoff valve gear. As described above, the cap member 30 is constituted such that the sum of the opening area of the first hole group 31 is larger than that of the second hole group 32. Therefore, a power of the fuel flowing into the lower chamber 11 by way of the first flow group 31 is stronger than that by way of the second hole group 32. Therefore, the fuel at inside of the lower chamber 11 produces a convection directed from a surrounding to a center of the float 40 to prevent the float 40 from being rapidly pressed up from right below. Thereby, the liquid shutoff valve gear can stably slide the float 40 even when the fuel flows into the lower chamber 11.

Further, when the fuel is filled, the fuel flows into the lower chamber 11 also from a side face thereof in an order of the second vent hole 16 and the first vent hole 15 of the outer cylinder 12. The respective vent holes 15, 16 are made to be symmetrical in the left and right direction by the connecting walls 19 at inside of the lower chamber 11, the fuel flowing therein to from the respective vent holes 15, 16 is uniformly divided to the left and to the right and convected to detour in a lateral direction by the inner walls 14. Therefore, the fuel smoothly flows to the lower chamber 11 and the float 40 can be prevented from being exerted with a large external force.

In a state in which the fuel at inside of the fuel tank 2 is substantially proximate to be filled up, the float 40 is moved up on the inner walls 14 by the buoyancy of the fuel and by being urged by the spring 41. At inside of the inner walls 14, a friction resistance is reduced by bringing the float 40 and the inner wall 14 into line contact with each other by way of the respective ribs 43, 14b, and the float 40 can easily be slid. Further, as shown by FIG. 10C, in the filled up state, the valve member 52 of the movable valve 50 disposed on the upper end portion of the float 40 is brought into contact with the opening portion 17 of the partition plate 13. Thereby, the opening portion 17 is closed, and therefore, the evaporated gas does not flow from the lower chamber 11 to the upper chamber 21.

Figure 11:
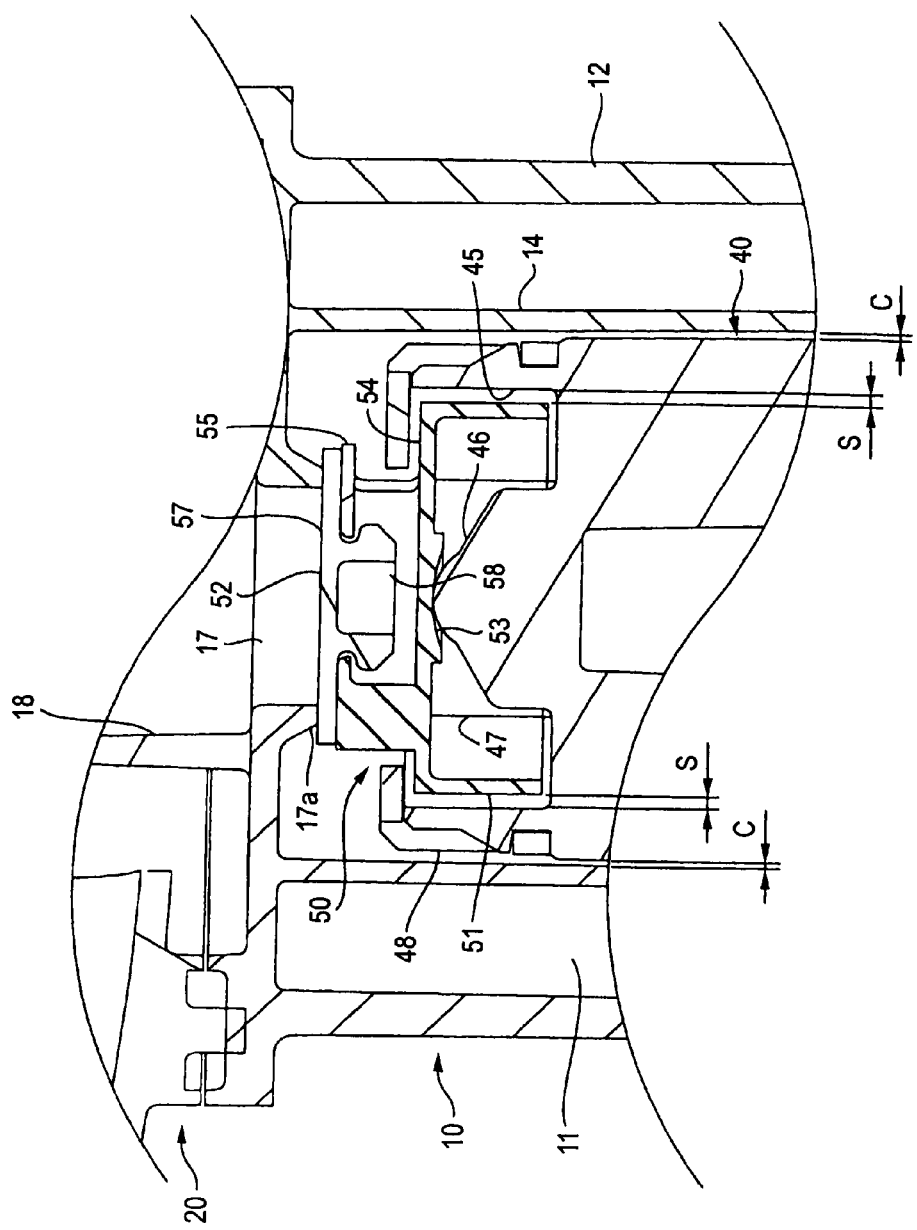
FIG. 11 is an enlarged side sectional view showing a state of shutting off valve means by the liquid shutoff valve gear according to the embodiment of the invention.

FIG. 11 is an enlarged side face sectional view showing a state of shutting off the valve means by the liquid shutoff valve gear according to the embodiment.

As shown by FIG. 11, when the opening portion 17 is shut off by the float 40, the elastic valve portion 57 of the valve member 52 is elastically bent to form the hermetically closed state. At this occasion, the projected portion 46 of the upper end face of the float 40 presses up the recessed portion 53 of the first floor plate 54 of the movable valve main body 51 to be brought into a state of pinching the movable valve 50 by the float 40 and the opening portion 17. Here, a radius of curvature of the circular arc face of the projected portion 46 of the float 40 is smaller than that of the recessed portion 53 of the movable valve main body 51, and therefore, the movable valve 50 is rockably supported. Further, the urging member 47 at inside of the movable valve main body 51 elastically urges rocking of the movable valve 50 in the up and down direction. The movable valve 50 is rockably supported three-dimensionally by bringing the recessed portion 53 and the projected portion 46 into contact with each other and by the urging member 47, and even when the fuel tank is inclined, the state of closing the movable valve 50 is liable to be maintained.

In rocking of the movable valve 50, a movement allowable range S is restricted by a clearance formed between the side peripheral face of the movable valve main body 51 and the side peripheral face of the guide wall 45 of the float 40. Further, when the opening portion 17 is shut off by the float 40, there is formed the clearance C for freely sliding the float 40 between the float 40 and the inner wall 14. The clearance C constitutes a range of capable of moving the float 40 in the diameter direction relative to the housing 1.

Additionally, the moveable distance of the valve in a direction perpendicular to an axis along a length of the lower chamber may be greater than a movable distance of the float in the direction perpendicular to the axis along the length of the lower chamber, by rocking the valve gear.

Figure 12A:
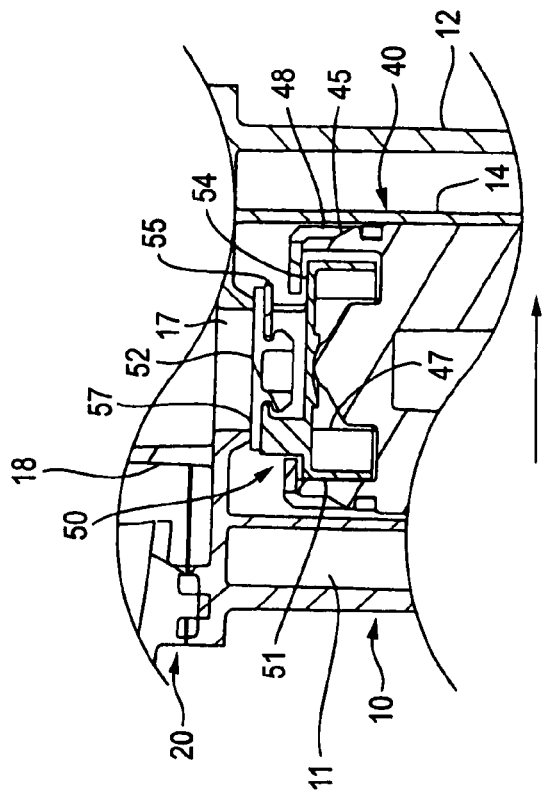
FIG. 12A and FIG. 12B are enlarged side sectional views showing an operation in rocking in a state of shutting off the valve means of the liquid shutoff valve gear according to the embodiment of the invention.
Figure 12B:
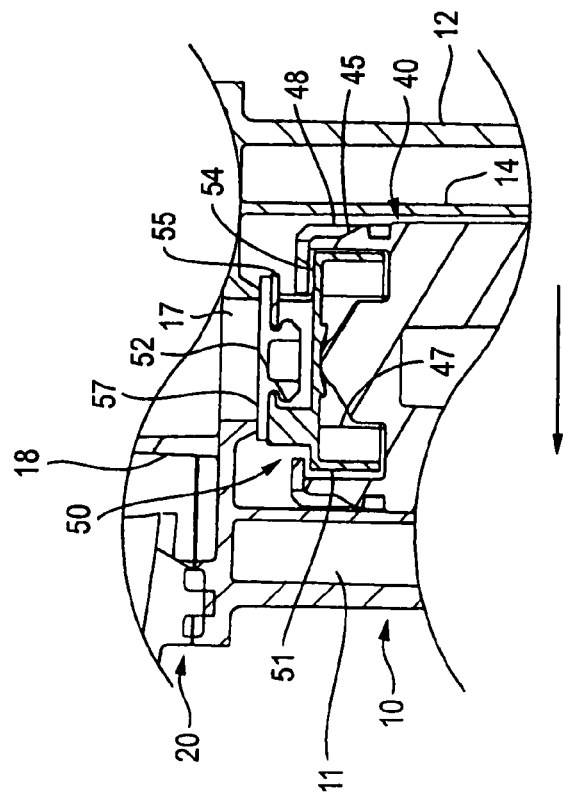

FIG. 12A and FIG. 12B are side sectional views showing an operation in rocking in a state of shutting off the valve means of the liquid shutoff valve gear according to the embodiment.

There is a case in which the fuel tank 2 is applied with a large vibration by a road face state or abrupt braking in driving an automobile. At that occasion, the liquid shutoff valve gear and the fuel are also rocked along with the fuel tank 2.

As shown by FIG. 12A and FIG. 12B, when the liquid shutoff valve gear is rocked, at the lower chamber 11, the float 40 is moved in the left and right direction at inside of the inner wall 12 by the clearance C between the housing 1 and the float 40. In the background art, by rocking the liquid shutoff valve gear, a gap is frequently produced in shutting the opening portion 17 by the valve means. In such a case, a splash of the fuel is liable to be scattered from the clearance between the opening portion 17 and the valve means, and there is a concern that the fuel is blown to the upper chamber 21.

According to the liquid shutoff valve of the embodiment, in order to restrain the fuel from being scattered, the float 40 and the movable valve 50 are constituted by separate members, and the movement allowable range S in a diameter direction of the float 40 and the movable valve 50 is set to be larger than the clearance C (refer to FIG. 11). Therefore, even when the float 40 is rocked relative to the clearance C, the rocking is restrained within the movement allowable range S of the movable valve 50, and therefore, the movable valve 50 per se is not rocked integrally with the float 40. Thereby, the state of closing the movable valve 50 and the opening portion 17 can be maintained.

Further, as shown by FIG. 8D, the upper face of the second floor plate 55 of the movable valve main body 51 is formed with the group portion 55a, and the elastic valve portion 57 of the valve main body 52 is constituted not to be adhered to the upper face of the movable valve main body 51. By preventing the elastic valve portion 57 from being adhered thereto, even when the movable valve 50 is assumedly slightly rocked simultaneously with the float 40, the state of closing the opening portion 17 by the elastic valve portion 57 can be maintained.

Further, when the fuel tank 2 is rocked, a wave is produced in the filled fuel. In this case, although there is a concern that the wave of the fuel enters the first vent hole 15 or the like of the urging main body 10, by making the inner wall 14 of the housing main body 10 opposed thereto, the wave can effectively be restrained from advancing.

FIG. 13A and FIG. 13B are enlarged sectional views showing the upper chamber of the liquid shutoff gear according to the embodiment, FIG. 13A shows the upper chamber when the valve means is closed and FIG. 13B shows the upper chamber when the liquid shutoff valve gear is inclined.

As shown by FIG. 13A, there is a case in which the fuel at inside of the lower chamber 11 is scattered as a splash when the opening portion 17 is closed by moving up the float 40 or when the liquid shutoff valve gear is rocked. According to the liquid shutoff valve gear of the embodiment, as described above, the partition wall 18 in the cylindrical shape is provided at inside of the upper chamber 21 opposedly to the opening 22a of the exhaust port. Therefore, the splash of the fuel scattered from the opening portion 17 is impacted to the partition wall 18 in a cylindrical shape to be prevented from flowing into the exhaust port 22.

Further, the fuel scattered by riding over the partition wall 18 in the cylindrical shape or the fuel flowing from the notched portion 18a of the partition wall 18 is guided to a side of the opening portion 17 by the flat floor face (upper face of the partition plate 13) at inside of the upper chamber 21 and the fuel can be returned by passing the notched portion 18a.

Further, although according to the embodiment, the upper face of the partition plate 13 is formed to be flat, the invention is not limited thereto but, for example, the upper face may be formed in a cone shape such that the opening portion 17 constitutes the lowest bottom portion. When formed in this way, the fuel entering inside of the upper chamber 21 can be guided to the opening portion 17 further smoothly.

As shown by FIG. 13B, when an automobile is disposed at, for example, a slope or the like, also the liquid shutoff valve gear is simultaneously brought into an inclined state. At this occasion, even when the fuel flows to inside of the upper chamber 21 of the liquid shutoff valve gear, the opening 22a of the exhaust port can store a constant amount of the fuel by an amount of projecting the opening 22 of the exhaust port at inside of the upper chamber 21. By the structure of the opening 22a of the exhaust port, the fuel can be prevented from flowing out from the exhaust port 22 further firmly. Further, also in closing the opening portion by the movable valve on the side of the lower chamber, the movable valve is inclined relative to the float followingly from the rocking fulcrum, and the opening portion can be maintained to be closed.

When the fuel at inside of the fuel tank 2 is used, and the liquid level of the fuel is reduced, the upper chamber 21 and the lower chamber 11 are released from being shut off. Generally, a fuel of a gasoline or the like is provided with a high volatility and exhausts an evaporated gas, and therefore, it is preferable to release the upper chamber 21 and the lower chamber 11 from being shut off swiftly. However, there is a concern that the valve means continues maintaining to close the opening portion 17 by an influence of an inner pressure at inside of the fuel tank 2 or the like. Therefore, according to the liquid shutoff valve gear, it is preferable that a restarting valve pressure of releasing the opening portion 17 from being closed is low.

Further, when the fuel flows out from the lower chamber 11 to inside of the fuel tank 2 by reducing the fuel, the fuel flows out from the first and the second hole groups 31, 32 of the cap member 30, or the first and the second vent holes 15, 16 of the outer cylinder 12. In flowing out the fuel, conversely to the case of flowing in the fuel, a convection by which the fuel flows out more powerfully from the outer side than from the center side is produced, and the float 40 can stably be moved down. Further, the cap member 30 can also be attached to the housing main body 10 to shift the cut-to-open portion 33 for the vent hole relative thereto to prevent the second vent hole 16 from being opened. This can particularly be applied to a case of intending to make the fuel flow in and out to and from the lower chamber 11 gradually and the liquid shutoff valve gear having a wide general purpose performance can be provided.

Further, the liquid shutoff valve gear of the embodiment is not limited to the above-described embodiment but can naturally be applied to embody or modified to embody variously as necessary. For example, although the notched portion 18a provided at the partition wall 18 in the cylindrical shape is constituted by being notched in the axial direction from the upper end portion according to the embodiment, basically, the notched portion 18a may be bored at a position brought into contact with the opening portion, and a shape and a size thereof may arbitrarily be set.

What is claimed is:

1. A liquid shutoff valve gear provided at an upper space inside of a hermetically sealed vessel for containing a liquid for making a gas flow in and out, to and from outside, and shutting off a leakage of the liquid from the hermetically sealed vessel, the liquid shutoff valve gear comprising:
    a housing divided into an upper chamber and a lower chamber by being partitioned by a partition plate including an opening portion;
    a float slidably contained inside of the lower chamber and moved up by receiving a buoyancy from the liquid inside of the hermetically sealed vessel;
    an exhaust port, through which the upper chamber communicates with outside of the hermetically sealed vessel, at a peripheral wall of the upper chamber;
    an upper end portion of the float including a valve for closing the opening portion of the partition plate in accordance with an upward movement of the float; and
    a partition wall comprising a cylindrical shape extending in an upper direction from a peripheral edge of the opening portion inside of the upper chamber, the partition wall being opposed to an opening of the exhaust port, and a notched portion, forming an opening extending through the partition wall, and being brought into contact with at least the peripheral edge of the opening portion such that the notched portion is formed in a portion of the partition wall not facing the opening of the exhaust port.

2. The liquid shutoff valve gear according to claim 1, wherein the upper chamber includes a floor face comprising an upper face of the partition plate, the floor face comprising a flat shape or a cone shape for guiding the liquid invading inside of the upper chamber to the opening portion by way of the notched portion.

3. The liquid shutoff valve gear according to claim 1, wherein the upper chamber is opened with a gas introducing port for taking the gas inside of the hermetically sealed vessel and guiding the gas to the exhaust port when the opening portion of the partition plate is closed by the valve at a peripheral wall of the partition portion, and the portion of the partition wall in which the notched portion is formed is not facing an opening of the gas introducing port.

4. The liquid shutoff valve gear according to claim 1, wherein the opening of the exhaust port is provided at a position projected to an inner side of an inner peripheral face of the upper chamber.

5. The liquid shutoff valve gear according to claim 1, wherein a bottom of the exhaust port is disposed further from the partition plate than a bottom of the notched portion.

6. The liquid shutoff valve gear according to claim 1, wherein the valve is disposed on the float such that the valve is rockably supported.

7. The liquid shutoff valve gear according to claim 1, wherein at least a portion of the exhaust port projects inside the upper chamber.

8. The liquid shutoff valve gear according to claim 1, wherein the partition wall includes a pair of end faces which do not contact each other, the pair of end faces opposing each other across the notched portion.

9. The liquid shutoff valve gear according to claim 1, wherein a movable distance of the valve in a direction perpendicular to an axis along a length of the lower chamber is greater than a movable distance of the float in the direction perpendicular to the axis along the length of the lower chamber, by rocking the valve gear.

10. The liquid shutoff valve gear according to claim 1, wherein the float comprises a plurality of flat faces extending in a direction perpendicular to an axis along a length of the lower chamber.

11. The liquid shutoff valve gear according to claim 1, wherein a bottom of the lower chamber comprises a plurality of holes,
    wherein the plurality of holes comprise a plurality of outer holes located closer to an outer side wall of the lower chamber than a plurality of inner holes, and
    wherein the an outer hole of the plurality of outer holes comprises a diameter greater than a diameter of an inner hole of the plurality of inner holes.

12. A liquid shutoff valve gear comprising:
    a housing divided into an upper chamber and a lower chamber, partitioned by a partition plate, the partition plate including an opening portion;
    a float slidably contained inside of the lower chamber and moved in an upward direction by receiving a buoyancy from a liquid inside of a hermetically sealed vessel;
    an exhaust port, through which the upper chamber communicates with outside of the hermetically sealed vessel at a peripheral wall of the upper chamber;
    an upper end portion of the float provided with a valve for closing the opening portion of the partition plate in accordance with upward movement of the float; and
    a partition wall comprising cylindrical shape extending in an upper direction from a peripheral edge of the opening portion inside of the upper chamber, the partition wall being opposed to an opening of the exhaust port, and a notched portion, forming an opening extending through the partition wall, and being brought into contact with at least the peripheral edge of the opening portion such that the notched portion is formed in a portion of the partition wall not facing the opening of the exhaust port.

* * * * *